(12) United States Patent
Berkey et al.

(10) Patent No.: US 6,201,918 B1
(45) Date of Patent: Mar. 13, 2001

(54) ATHERMALIZED CODOPED OPTICAL WAVEGUIDE DEVICE

(75) Inventors: George Edward Berkey, Pine City, NY (US); Lisa Wan-I Liou, Pleasanton, CA (US); Robert Adam Modavis, Painted Post, NY (US); Daniel Aloysius Nolan; David Lee Weidman, both of Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 08/989,200

(22) Filed: Dec. 11, 1997

Related U.S. Application Data
(60) Provisional application No. 60/033,140, filed on Dec. 20, 1996.

(51) Int. Cl.[7] ..................................... G02B 6/16
(52) U.S. Cl. ............................. 385/128; 385/142
(58) Field of Search ..................... 385/128, 142

(56) References Cited

U.S. PATENT DOCUMENTS

| | | |
|---|---|---|
| 4,025,156 | 5/1977 | Gloge et al. . |
| 4,106,850 * | 8/1978 | Marcatili .............................. 385/142 |
| 4,111,525 * | 9/1978 | Kaminow et al. .................... 385/142 |
| 4,165,223 | 8/1979 | Powers ........................................ 65/2 |
| 4,277,270 * | 7/1981 | Krohn ..................................... 385/142 |
| 4,358,181 | 11/1982 | Gulati et al. . |
| 4,432,606 * | 2/1984 | Blair ....................................... 385/128 |
| 4,482,205 | 11/1984 | Lagakos et al. .................. 350/96.34 |
| 4,768,859 | 9/1988 | Kasori et al. ...................... 350/96.34 |
| 4,979,971 | 12/1990 | Kyoto et al. ........................... 65/3.12 |
| 5,011,251 | 4/1991 | Miller et al. ....................... 350/96.15 |
| 5,018,827 | 5/1991 | Brownrigg et al. ................. 350/96.3 |
| 5,064,266 * | 11/1991 | Sun et al. ................................ 385/35 |
| 5,127,928 | 7/1992 | Farries et al. ............................. 65/2 |
| 5,295,205 | 3/1994 | Miller et al. . |
| 5,488,475 | 1/1996 | Friebele et al. ....................... 356/352 |
| 5,563,967 | 10/1996 | Haake ..................................... 385/12 |
| 5,703,978 | 12/1997 | DiGiovanni et al. . |
| 5,757,540 | 5/1998 | Judkins et al. . |

FOREIGN PATENT DOCUMENTS

| | | |
|---|---|---|
| 0 800 098 | 4/1997 | (EP) . |
| WO 93/18420 | 9/1993 | (WO) . |
| WO 94/00784 | 1/1994 | (WO) . |

OTHER PUBLICATIONS

Abstract of Japanese Patent JP 62189407 (Aug. 19, 1987) Light Waveguide Manufacturing, Agency of Industrial Science & Technology.

Abstract of SU Patent SU 923979 (Apr. 30, 1982), Photochromatic glass Composition, As Geor Cybernetics.

Corning SMF–28™ CPC6 Single–Mode Optical Fiber (Product Information PI1306, Issued: Oct. 1994, Web Page Sep. 6, 1996).

OFC '96, Mar. 1996, Postdeadline papers"Temperature–insensitive long–period fiber gratings". J.B. Judkins et al.

OFC '97 Mar. 1997 Technical Digest, p. 347–348, "A novel temperature–insensitive long–period fiber grating using a boron–codoped–germanosillcate–core fiber", K. Shima et al., Fujikura.

(List continued on next page.)

*Primary Examiner*—James W. Davie
(74) *Attorney, Agent, or Firm*—Svetlana Short; Edward F. Murphy; Mary Y. Redman

(57) ABSTRACT

Athermalized optical waveguide devices and methods of making the athermalized devices are described. Boron is incorporated into the composition of the optical waveguides in order to athermalize the waveguides by reducing spectral shifts caused by changes in temperature. The invention includes the utilization of boron dopants in the core and cladding of optical waveguide devices such as Mach-Zehnder coupler devices and long period fiber gratings.

30 Claims, 10 Drawing Sheets

OTHER PUBLICATIONS

Proceed. of 18th European Conference on Optical Communications, vol. 1, Sep. 27, 1992, Berlin, Germany, "Enhanced Photosensitivity in Germania Doped Silica Fibres for Future Optical Networks", D.L. Williams et al.

Journal of Lightwave Technology, vol. 14, No. 1, Jan. 1996, "Long–Period Fiber Gratings as Band–Rejection Filters", A.M. Vengsarkar et al.

Applied Optics, vol. 20, No. 19, Oct. 1, 1981, "Minimizing temperature sensitivity of optical fibers", N. Lagakos et al.

SPIE vol. 1516 International Workshop on Photoinduced Self–Organization Effects in Optical Fiber (1991), p. 185–199, "Bragg grating formation and germanosilicate fiber photosensitivity", G. Meltz et al. No Month.

Optical Properties of Glass, Ed. by D.R. Uhlman & N.J. Kreidl, 1991, "Optical Properties of Oxide Glass", W. Vogel. No Month.

J. Appl. Phys., vol. 44, No. 12, Dec. 1973, "Binary $SiO_2$–$B_2O_3$ glass system: Refractive index behavior and energy gap considerations"., S.H. Wemple et al.

Electronics Letters, Nov. 23rd, 1995, vol. 31, No. 24, p. 2120–21, Accelerated Lifetime tests of UV written intra–core gratings in boron germania codoped silica fibre, D.L. Williams.

Journal of the Optical Society of America, vol. 59, No. 7, Jul. 1969, "Thermal Coefficient of Refractive Index of Optical Glasses", T. Baak.

Electronics Letters, Jan. 7, 1993, vol. 29, No. 1, p. 45–47, "Enhanced UV Photosensitivity in Boron Codoped Germanosilicate Fibres", D.L. Williams et al.

Materials Chemistry and Physics 42 (1995) 214–216, "Multilayer dielectric materials of $SiO_x$/$Ta_2O_5$/$SiO_2$ temperature–stable diode lasers", A.K. Chu et al. No Month.

OFC '95 Technical Digest, Mar. 1995 p. 134–135, "Temperature compensated optical–fiber Bragg gratings", G.W. Yoffe et al.

Corning Optical Fiber Products, Web Page Sep. 6, 1996, Corning Optical Fiber Information Center.

CS–1300 80/165 Single–Mode Fiber (P1913, Issued Sep. 1992).

Patent Abstracts of Japan, vol. 006, No. 209 (P–150), Oct. 21, 1982 & JP 57 114111 A (Nippon Denshin Denwa Kosha), Jul. 15, 1982.

Williams, D.L. et al., Temperature Stable 1.3 $\mu$m Laser with Bragg Fibre Grating External Cavity for Access Networks, Proceedings of the European Conference on Optical Communication (EC, Montreux, Sep. 12–16, 1993 Regular Papers, vol. 2, No. CONF. 19, 1993, Swiss Electrotechnical Association, pp. 209–212.

Williams D.L. et al., Enhanced UV Photosensitivity in Boron Codoped Germanosilicate Fibres, Electronics letters, vol. 29, No. 1, Jan. 7, 1993, pp. 45–47.

Database WPI, Section Ch, Week 7921, Derwent Publications Ltd., London, GB; Class L01, AN 79–39873B & JP 54 048 566 A (Fujikura Cable Works Otd), Apr. 17, 1979 (abstract).

GB 2 029 400 A (Sumitomo Electric Industries; Nippon Telegraph & Telephone) Mar. 19, 1980.

A Temperature Insensitive InGaAsP–InP Optical Fiber, H. Tanobe, Y. Kondo, Y. Kadota, H. Yasaka and Y. Yoshikuni, IEEE Photonics Technology Letters vol. 8, No. 11, Nov. 1996.

Athermal silica–based arrayed–waveguide grating (AWG) multiplexer Yasuyuki Inoue, Akimasa Kaneko, Fumiaki Hanawa, Hiroshi Takahashi, Shin Sumida, NTT Opto–electronics Laboratories, ECOC97 Conf. Publication, Sep. 22, 1997.

Temperature–independent narrowband optical fiber at 1.3$\mu$m wavelength by an athermal waveguide, K. Kokubun, S. Yoneda and H. Tanaka, Electronics Letters, Oct. $10^{th}$ 1996, vol. 32, No. 21.

Temperature and polarisation insensitive Bragg gratings realised on silica waveguide on silicon, D. Bose, B. Loisel, M. Moisan, N. Devoldere, F. Legall and A. Rolland, Electronics Letters, Jan. $16^{th}$ 1997, vol. 33, No. 2.

* cited by examiner

ATHERMALIZED CODOPED OPTICAL WAVEGUIDE DEVICE

This application claim benefit to Provisional application 60/033,140 filing date Dec. 20, 1996.

FIELD OF THE INVENTION

This invention relates to an optical waveguide device in which thermal spectral shifts are inhibited. In particular, this invention relates to athermalized optical waveguiding devices in which the light transmitting properties are insensitive to temperature variations and fluctuations.

BACKGROUND OF THE INVENTION

Optical waveguide devices, such as Mach-Zehnder coupler devices and long period fiber gratings, which are utilized with optical signals as transmitting filters, sensors, and wavelength multiplexing and demultiplexing devices provide good performance at standard room temperatures but exhibit thermal spectral shifts and related poor performance when used in environments where they are exposed to thermal variation and fluctuations in temperatures.

Mach-Zehnder coupler devices and long period fiber gratings can be used in narrow-band, multi-wavelength system applications as transmitting filters. In addition, Mach-Zehnder coupler devices can be used as sensors, and wavelength multiplexing and demultiplexing devices.

In a long period fiber grating a long period grating is formed in the fiber which functions to couple light between the fundamental mode propagating in the waveguide core and a guided cladding mode. Such gratings have an index modulation along the waveguiding axis of the fiber, and may be formed by writing with UV irradiation, etching, or other means of making periodic perturbations.

A Mach-Zehnder coupler device is a form of a Mach-Zehnder interferometer. In a Mach-Zehnder coupler device, a coupler splits light into two or more waveguides, typically optical fibers, which have different optical path lengths. A second coupler recombines this light after the light has traveled the different optical path lengths. In addition, Mach-Zehnder coupler devices may be used as demultiplexers and in sensor applications. Variations in the Mach-Zehnder coupler device family includes MultiClad™ Mach-Zehnder coupler devices, fused fiber Mach-Zehnder coupler devices and Mach-Zehnder lattice filters.

It has been found that the use of optical waveguide devices such as long period fiber gratings and Mach-Zehnder coupler devices is limited by their temperature dependence. In such devices, thermal spectral shifts of greater than 0.04 nm/° C. at a transmitting wavelength of 1550 nm limit their application and usefulness in environments of differing temperature.

SUMMARY OF THE INVENTION

Accordingly, the present invention is directed to an optical waveguide that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the compositions, structures, and methods particularly pointed out in the written description and claims hereof as well as the appended drawings.

To achieve these and other advantages and in accordance with the purpose of the invention, as embodied and broadly described, the invention provides an athermal optical waveguide device in which at least one light transmitting $GeO_2$ doped silica core is codoped with $B_2O_3$ to inhibit thermal spectral shifts induced by changes in temperature.

In another aspect, the invention includes an athermal optical waveguide doped with $B_2O_3$.

A further aspect of the invention is to provide a method of athermalizing an optical waveguide by codoping the waveguide with $B_2O_3$ to neutralize the optical waveguide's thermal sensitivity.

It is to be understood that both the foregoing general description, and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and, together with the description, serve to explain the principles of the invention.

PRIOR ART

Figure 1:
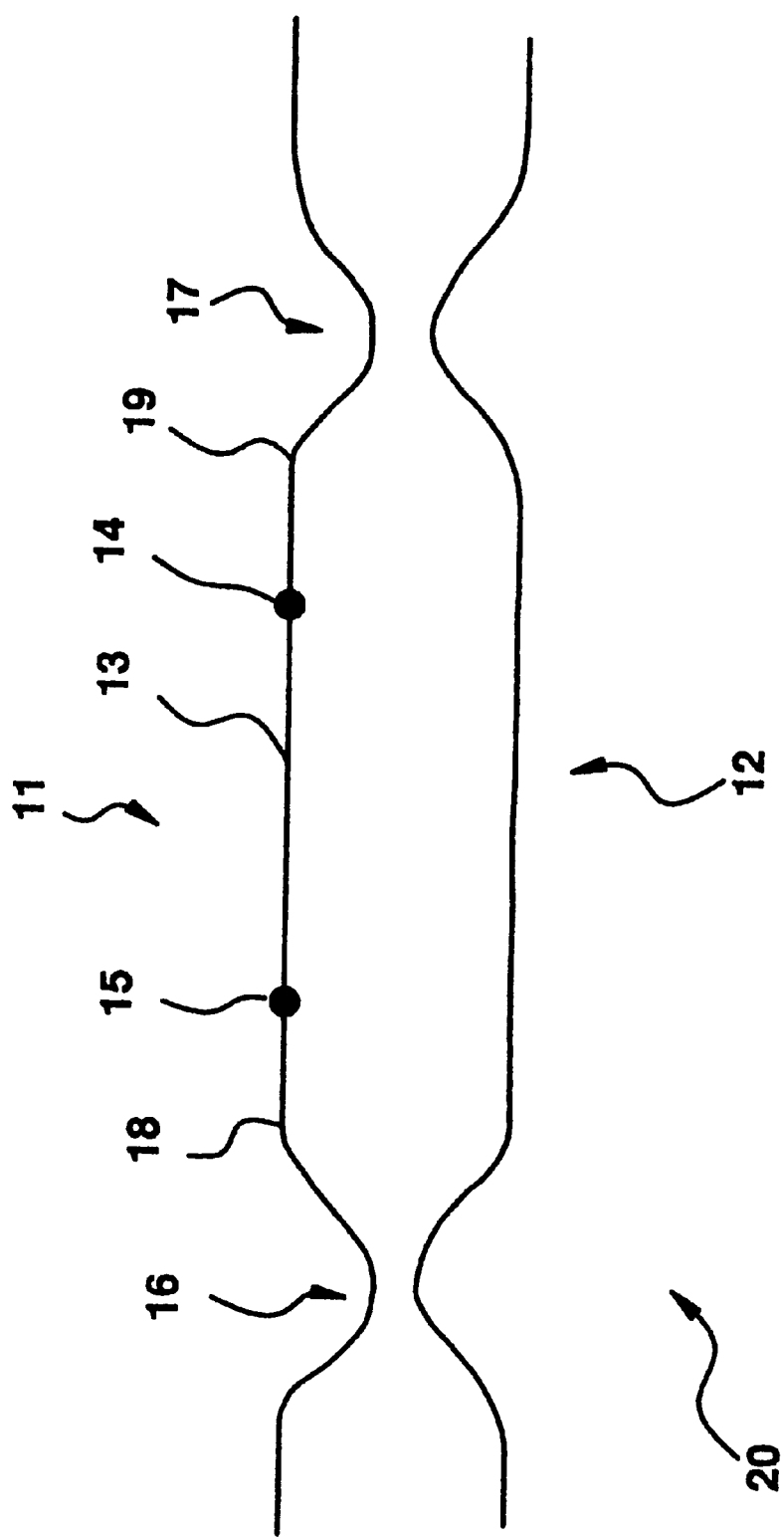
FIG. 1 comprises a schematic representation of a Mach-Zehnder coupler device.

Prior art of possible relevance is provided separately.

DETAILED DESCRIPTION OF THE INVENTION

The optical waveguide device of the invention includes a germania doped silica core and a sufficient amount of $B_2O_3$ dopant to inhibit thermal spectral shifts.

Reference will now be made in detail to the present preferred embodiments of the invention, examples of which are illustrated in the accompanying drawings.

The athermal optical waveguide devices of the invention include optical waveguides, optical fibers, Mach-Zehnder coupler devices and long period fiber gratings which provide for the transmission of light through a silica core. The athermal optical waveguide devices of the invention are useable over a broad temperature range as transmitting filters, demultiplexers, multiplexers, and sensors.

The optical waveguide devices of the invention include an optical waveguiding silica core doped with an index raising dopant and a sufficient amount of $B_2O_3$ codopant to inhibit thermal spectral shifts in the device when the device is subjected to changes in temperature. The preferred index raising dopant of the invention is $GeO_2$.

The optical waveguide devices of the invention include transmitting filters. The transmitting filters of the invention include long period fiber gratings and Mach-Zehnder interferometers. A Mach-Zehnder coupler device of the invention utilizes a Mach-Zehnder interferometer in which a mode of light guided by a first waveguiding core is coupled to a second waveguiding core. The long period fiber grating transmitting filters of the invention provide for a mode of light propagating in a waveguiding core to couple with a mode in the cladding of the waveguide.

The optical waveguide devices of the invention include a silica core which has a $B_2O_3$:$GeO_2$ ratio ranging from 1 wt. % $B_2O_3$ 3 wt. % $GeO_2$ to 1 wt. % $B_2O_3$:10 wt. % $GeO_2$, more preferably ranging from 1 wt. % $P_2O_3$:4 wt. % $GeO_2$ to 1 wt. % $B_2O_3$ 6 wt. % $GeO_2$. A preferred silica core has a 1 wt. % $B_2O_3$:5 wt. % $GeO_2$ ratio.

The athermalized optical waveguide includes a silica glass composition which has a dopant content of $B_2O_3$ and one or more index raising dopants, wherein the dopant content has a $B_2O_3$:index raising dopant molar ratio ranging from 1 mole $B_2O_3$:1.5 moles of index raising dopants to 1 mole $B_2O_3$:8 moles of index raising dopants. A preferred dopant content range is from 1 mole $B_2O_3$:2 moles of index raising dopants to 1 mole $B_2O_3$:7 moles of index raising dopants. A more preferred dopant content range is from 1 mole $B_2O_3$:3 moles of index raising dopants to 1 mole $B_2O_3$:4 moles of index raising dopants.

The method of making the optical waveguide devices of the invention includes the method of athermalizing the optical waveguide device to inhibit thermal spectral shift. This method includes forming a silica waveguide core and doping the core with an index raising dopant, preferably $GeO_2$. This method further includes the step of codoping the core with $B_2O_3$. Codoping with $B_2O_3$ provides for a sufficient amount of $B_2O_3$ wherein the waveguide device exhibits a thermal spectral shift of less than 0.04 nm/° C. at 1550 nm when subjected to a temperature variation. The core is codoped with a sufficient amount of $B_2O_3$ to neutralize the core's thermal sensitivity.

This method may further include the step of forming a Mach-Zehnder interferometer with the codoped silica waveguide core.

This method can also include the step of cladding the codoped waveguide core to form an optical waveguide. Such a cladding can be comprised of silica or $B_2O_3$ doped silica. An additional step of the invention is to write a long period grating in the optical waveguide.

The invention includes the method of reducing the temperature dependance of optical waveguide devices. This method includes the steps of forming a waveguide core, doping the waveguide core with an index raising dopant having a positive thermal spectral shift slope, and codoping the waveguide core with a second dopant having a negative thermal spectral shift slope. Codoping the core includes the step of neutralizing the positive thermal spectral shift slope of the core with the negative thermal spectral shift slope of the second dopant. Said second dopant is preferably boron, which is an index depressing dopant. The step of codoping can further comprise codoping with an amount of the second dopant so that the molar ratio of the second dopant to the index raising dopant is in the range of 1 mole of the second dopant to 2–4 moles of the index raising dopant.

This method further includes the steps of cladding the waveguide core and fabricating an optical waveguide device from the cladded waveguide core. Such a cladding may include the use of a glass doped with the second dopant.

The invention includes the method of making an optical waveguide with a reduced temperature dependence by doping a waveguide with an index altering dopant which allows light to be guided and doping the waveguide with a temperature dependance liberating dopant which reduces the temperature dependence of the waveguide.

The athermalized optical waveguide of the invention includes a core and a cladding wherein the core and the cladding have a difference in $B_2O_3$ dopant content ranging from 1 to 5 wt. % $B_2O_3$, with a preferred difference ranging from 2 to 4 wt. % $B_2O_3$.

U.S. Pat. No. 5,295,205 to Miller et al., the disclosure of which is hereby incorporated by reference, discloses a Mach-Zehnder coupler device and a method of making such devices.

One embodiment of the invention comprises a Multi-Clad™ Mach-Zehnder coupler device which utilizes a first optical fiber having a silica core doped with $GeO_2$ which is codoped with $B_2O_3$ in order to inhibit thermal spectral shifts in the Mach-Zehnder coupler device caused by a change in temperature. The Mach-Zehnder coupler device of the invention further includes a second optical fiber having a $B_2O_3$ dopant concentration different from the first optical fiber. Such an embodiment provides a Mach-Zehnder coupler device that has a reduced sensitivity to temperature variations.

A number of MultiClad™ Mach-Zehnder coupler devices of the type having two arms of equal physical path lengths but differing fundamental mode effective indices, as illustrated in FIG. 1 by Mach-Zehnder coupler device 20, were made and analyzed at temperatures ranging from −40° C. to 125° C. In FIG. 1, spliced Mach-Zehnder coupler device arm 11 has the same physical path length as unspliced Mach-Zehnder coupler device arm 12. First coupler 16 splits light into spliced coupler arm 11 and unspliced coupler arm 12. Spliced coupler arm 11 has an optical path length different from the optical path length of unspliced coupler arm 12 due to the insertion of optical path changing fiber segment 13. Second coupler 17 recombines the split light propagating through coupler arms 11 and 12. In Mach-Zehnder coupler device 20 light is selectively transmitted by the Mach-Zehnder interferometer by being split into two differing optical path lengths and then recombined. The invention may also be utilized with other forms of Mach-Zehnder interferometers and coupler devices, for example Mach-Zehnder coupler devices with more than two arms, Mach-Zehnder coupler devices with unequal coupler splitting, and Mach-Zehnder coupler devices having arms of different physical path lengths.

A comparison model of a Mach-Zehnder coupler device was made as shown in FIG. 1 with commercially available optical fibers. Experimental Mach-Zehnder coupler devices of the invention were made as shown in FIG. 1 and compared with the comparison model. In the comparison model the Mach-Zehnder coupler device's unspliced coupler arm 12 was made from commercially available Corning SMF-28™ single mode optical fiber.

Figure 2:
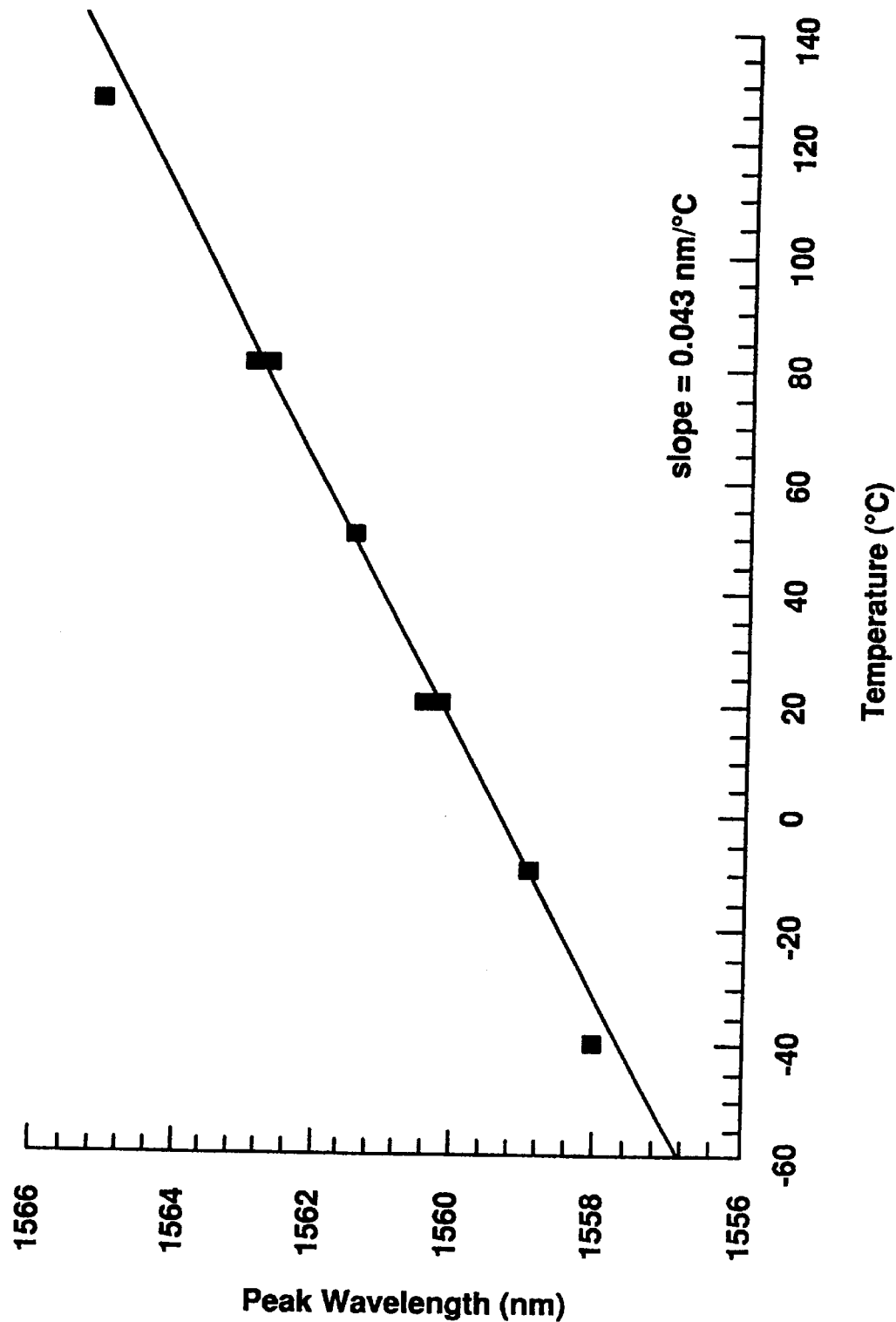
FIG. 2 is a plot of Temperature (° C.) versus Peak Wavelength (nm) for a comparison model of a Mach-Zehnder coupler device.

Spliced coupler arm 11, which has the same physical path length as unspliced coupler arm 12, was made by splicing in a segment of commercially available Corning CS-980™ single mode optical fiber. Corning SMF-28™ single mode optical fiber has a core-clad Δ=0.35% with a cutoff of 1260 nm and a $GeO_2$ doped silica core, which is doped with about 6–10 wt. % $GeO_2$. Corning CS-980™ single mode optical fiber has a core-clad Δ=1.0% with a cutoff of 950 nm and a $GeO_2$ doped silica core, which is doped with about 18–20 wt. % $GeO_2$. In this comparison model spliced in fiber segment 13, a 10 mm segment of Corning CS-980™ single mode optical fiber was spliced between Corning SMF-28™ single mode optical fiber segments 18 and 19 at splicings 15 and 14. The thermal spectral shift of this Mach-Zehnder comparison model coupler was analyzed using an optical spectrum analyzer and an erbium ASE light source. The performance of this comparison model at a variety of temperatures in the range of −40° C. to 125° C. was tested using a thermal chamber. The thermal spectral shift of the comparison model is shown in FIG. 2 which is a plot of Peak Wavelength (nm) versus Temperature (° C.) From FIG. 2 it was determined that this comparison model had a thermal spectral shift coefficient of 0.043 nm/° C. Virtually identical thermal spectral shift coefficients were measured for other comparison models which had a variety of $GeO_2$ core dopant levels, arm lengths and fiber types such as Corning SMF-28™ and CS-980™ optical fibers with different cutoffs, optical fibers with a $TiO_2$ doped silica core, and a step index optical fiber having a Δ=2.0% with a cutoff of 1210 nm.

Figure 3:
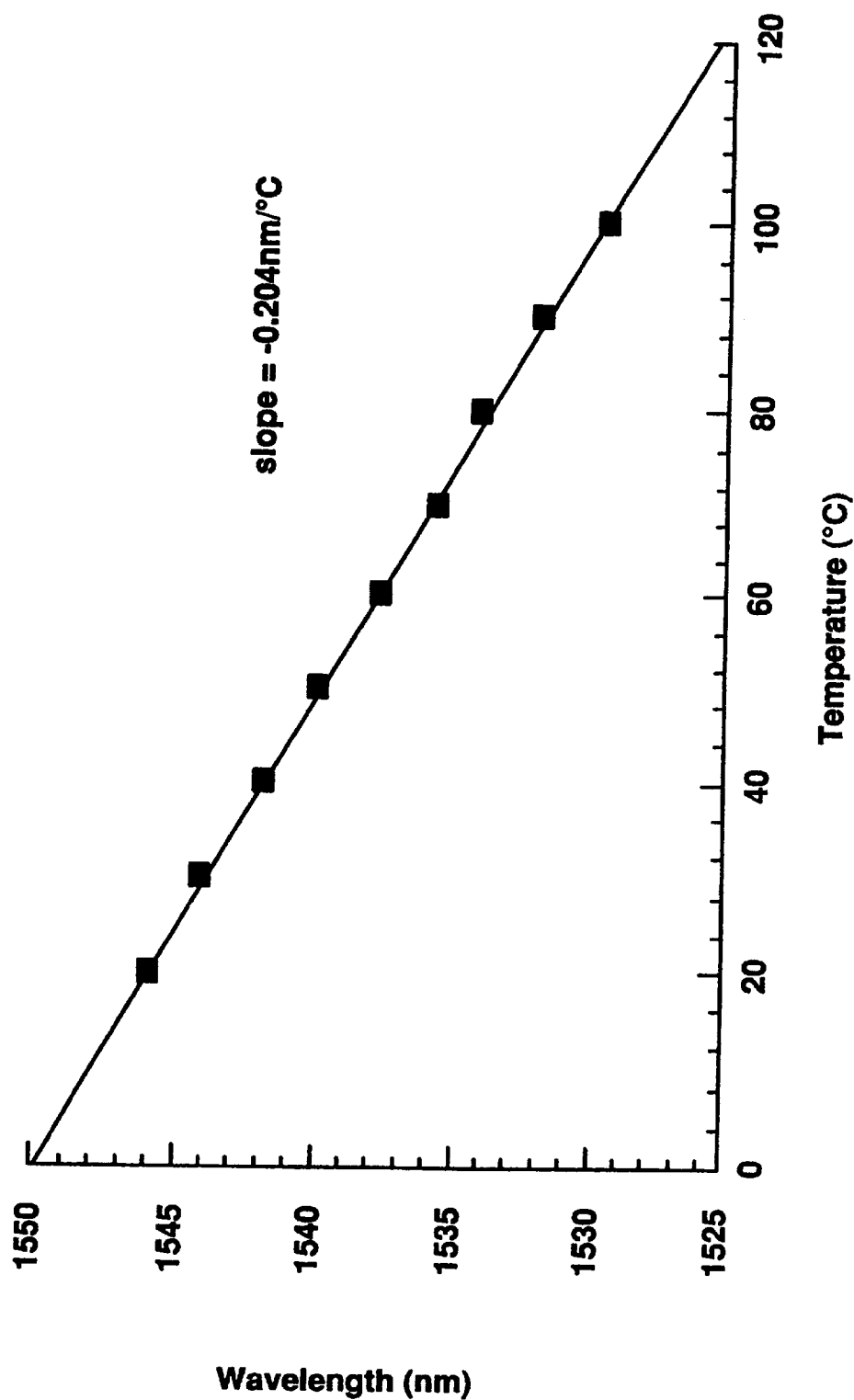
FIG. 3 is a plot of Temperature (° C.) versus Peak Wavelength (nm) for a Mach-Zehnder coupler device in accordance with the teachings of the present invention.

Experimental Mach-Zehnder coupler device No. 1 was made with the configuration of Mach-Zehnder coupler device 20 of FIG. 1 and in the same set up and manner as the comparison model except that spliced in fiber length 13 was not Corning CS-980™ optical fiber. The spliced in fiber length 13 of experimental coupler No. 1 was a 10 mm section of an experimental fiber having an optical waveguiding silica core doped with 25 wt. % $GeO_2$ and codoped with 14 wt. % $B_2O_3$. (16.5 mole % $GeO_2$, 13.7 mole % $B_2O_3$, and 69.8 mole % $SiO_2$) The thermal spectral shift of experimental coupler No. 1 was analyzed in the same manner as the comparison model. The thermal spectral shift of experimental coupler No. 1 is shown in FIG. 3 which is a plot of Peak Wavelength (nm) versus Temperature (° C.). From FIG. 3 it was determined that experimental coupler No. 1 had a thermal spectral shift coefficient of −0.204 nm/° C.

Figure 4:
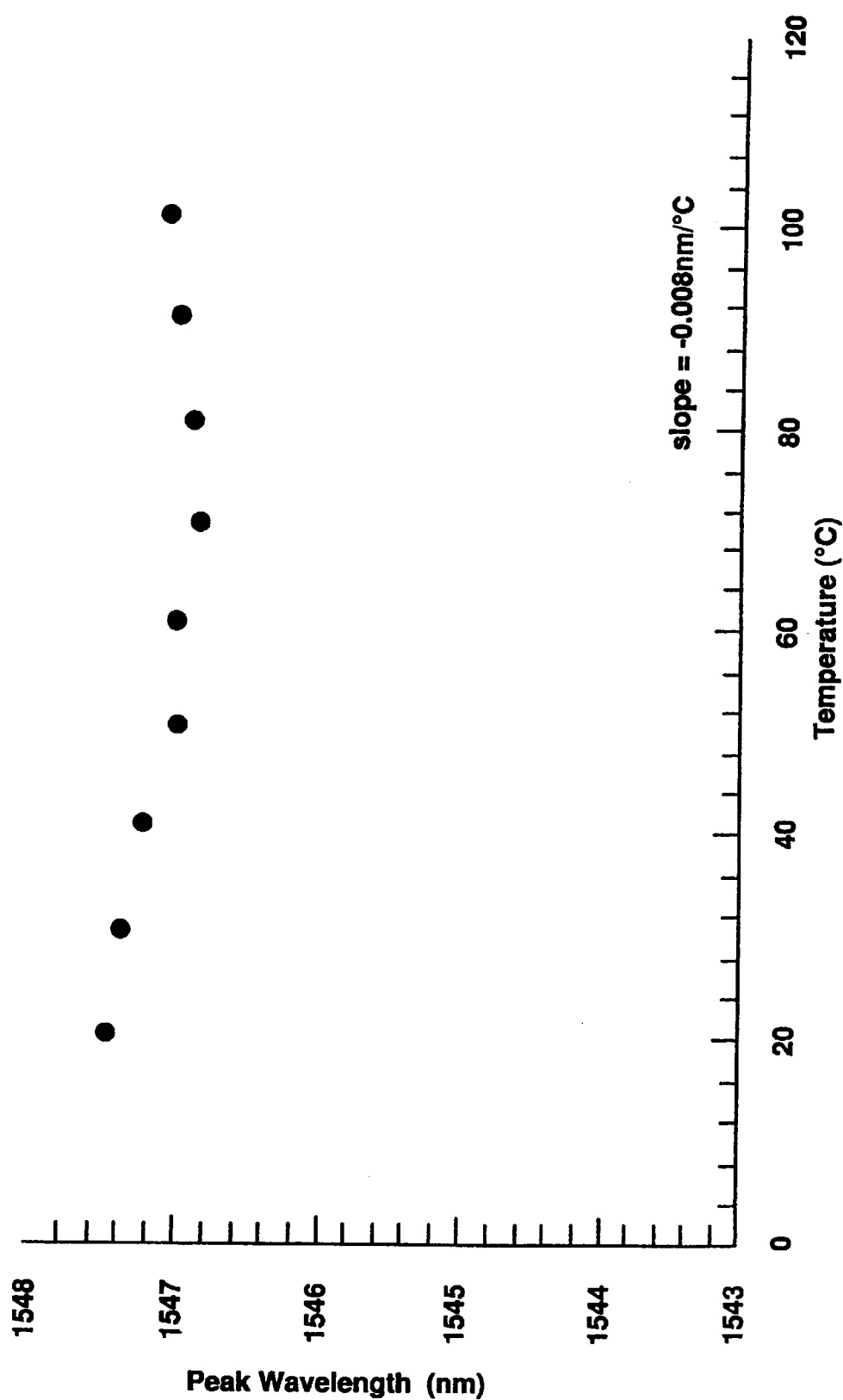
FIG. 4 is a plot of Temperature (° C.) versus Peak Wavelength (nm) for a Mach-Zehnder coupler device in accordance with the teachings of the present invention.

Experimental Mach-Zehnder coupler device No. 2 was made with the configuration of Mach-Zehnder coupler device 20 of FIG. 1 and in the same manner and setup as the comparison model except that spliced in fiber length 13 was a fiber segment comprised of a 7.757 mm length of Corning CS-980™ single mode optical fiber, as used in the comparison model, spliced with a 1.158 mm length of experimental fiber having a silica core doped with 25 wt. % $GeO_2$ and codoped with 14 wt. % $B_2O_3$, as used in experimental coupler No. 1. This combination of spliced fiber for experiment coupler No. 2 was chosen so as to achieve a net zero thermal spectral shift coefficient. The thermal spectral shift of experimental coupler No. 2 was analyzed in the same manner as the comparison model. The thermal spectral shift of experimental coupler No. 2 is shown in FIG. 4 which is a plot of Peak Wavelength (nm) versus Temperature (° C.). From FIG. 4 it was determined that experimental coupler No. 2 had a thermal spectral shift coefficient of −0.008 nm/° C.

Figure 5:
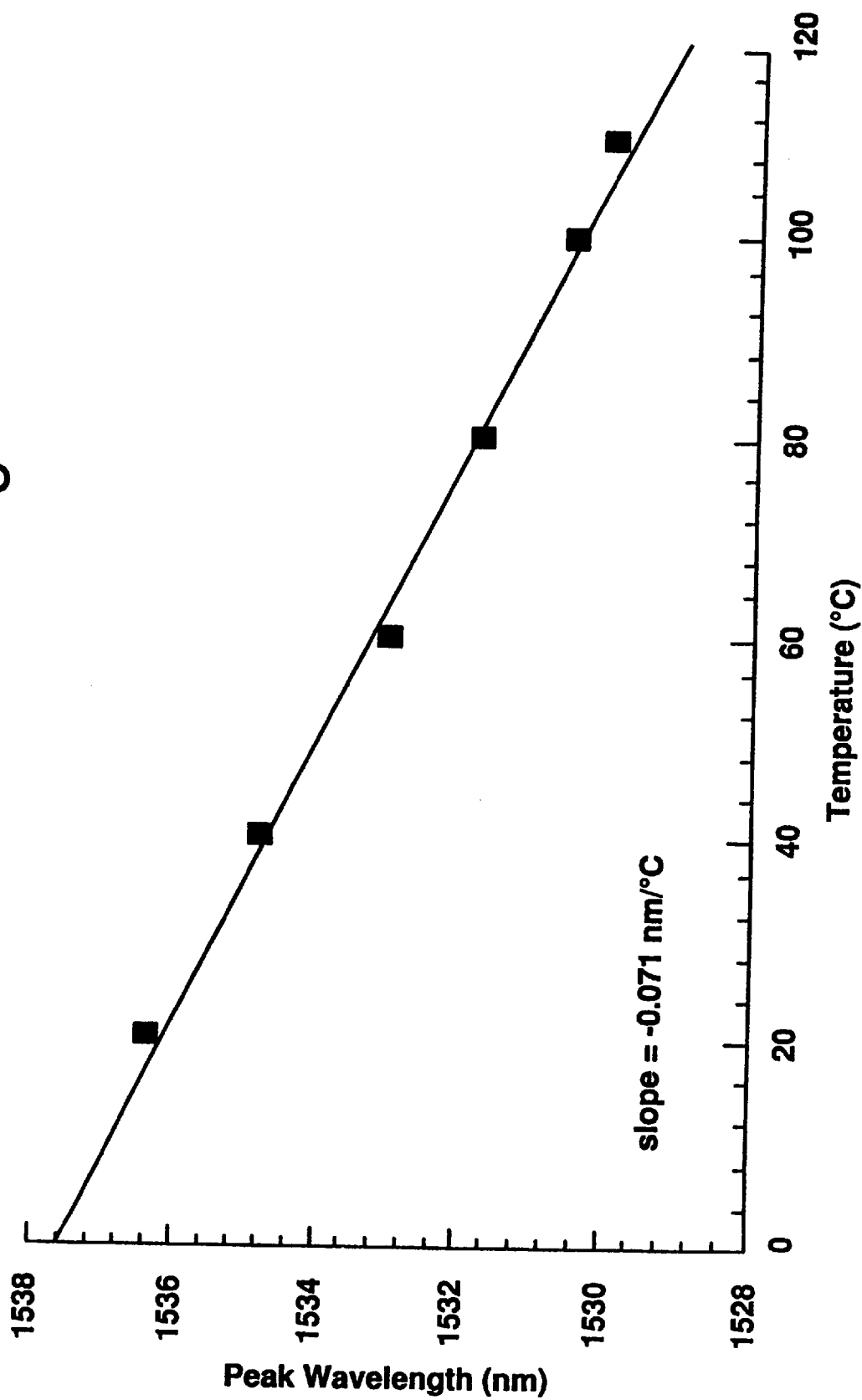
FIG. 5 is a plot of Temperature (° C.) versus Peak Wavelength (nm) for a Mach-Zehnder coupler device in accordance with the teachings of the present invention.

Experimental Mach-Zehnder coupler device No. 3 was made with the configuration of Mach-Zehnder coupler device 20 of FIG. 1 and in the same manner and set up as the comparison model except that spliced in fiber length 13 was a 10 mm section of an experimental fiber having an optical waveguiding silica core doped with 15 wt. % $GeO_2$ and codoped with 5 wt. % $B_2O_3$. (9.3 mole % GeO., 4.6 mole % $B_2O_3$, 86.1 mole % $SiO_2$) This experimental codoped fiber was fabricated by the outside vapor deposition process using a flame hydrolysis apparatus with appropriate silica, $GeO_2$ dopant, and $B_2O_3$ codopant feedstock levels to result in this core which was cladded with silica. The thermal spectral shift of experimental coupler No. 3 was analyzed in the same manner as the comparison model. The thermal spectral shift of experimental coupler No. 3 is shown in FIG. 5 which is a plot of Peak Wavelength (nm) versus Temperature (° C.) . From FIG. 5 it was determined that experimental coupler No. 3 had a thermal spectral shift coefficient of −0.07 nm/° C.

Figure 6:
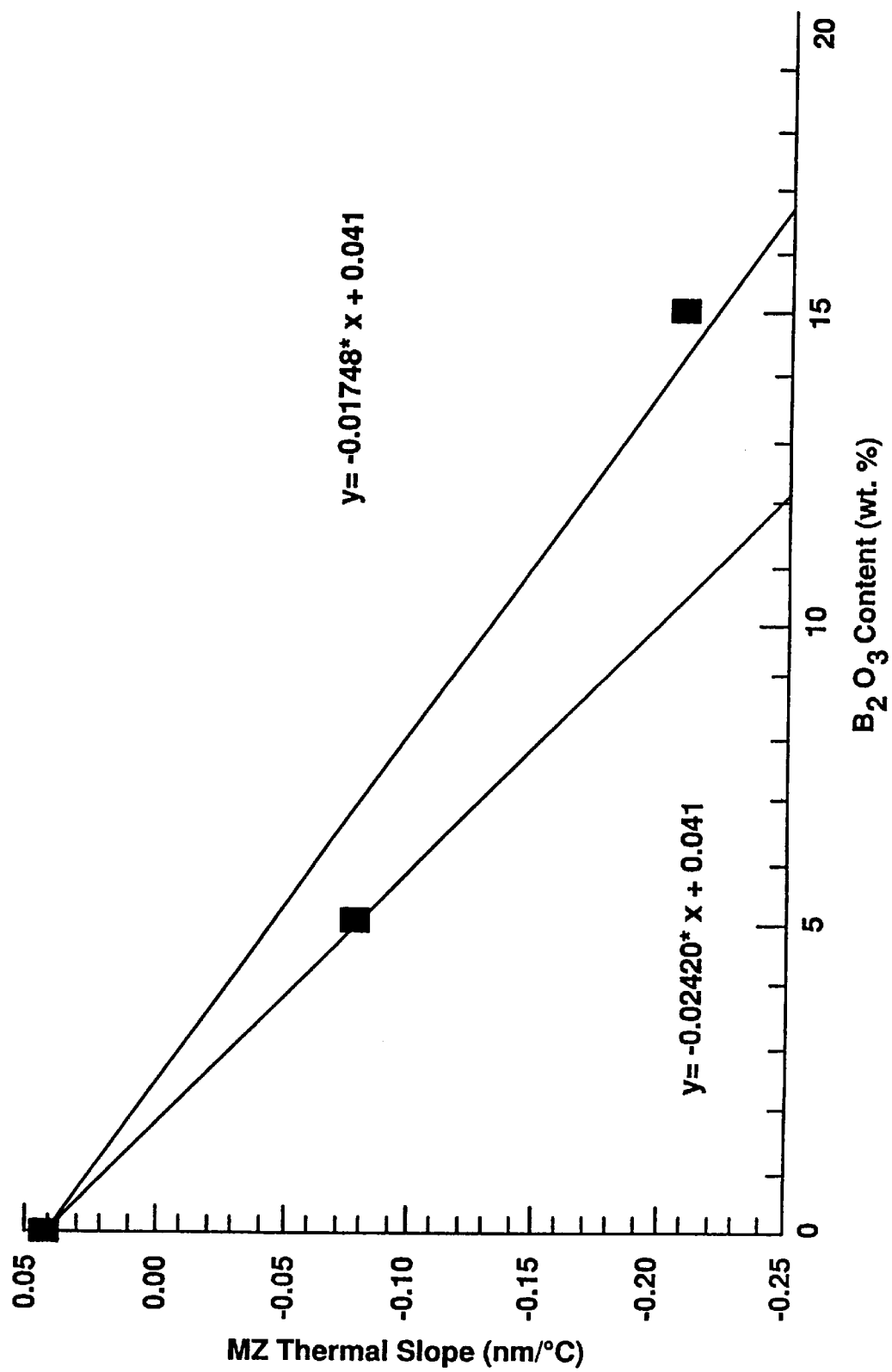
FIG. 6 is a plot of $B_2O_3$ Content (wt. %) versus Thermal Spectral Shift Coefficients (nm/° C.) in accordance with the teachings of the present invention.

Hypothetical experimental Mach-Zehnder coupler device No. 4 would be fabricated from a unitary spliced in fiber length 13 to avoid the complications of a spliced in fiber length 13 made from a $GeO_2$ doped fiber and a $GeO_2$ doped $B_2O_3$ codoped fiber as in experimental Mach-Zehnder coupler device No. 2 to achieve an athermalized optical waveguide device with a nearly zero thermal spectral shift coefficient. FIG. 6 shows the thermal spectral shift coefficients of the comparison model (0.043 nm/° C. at 0 wt. % $B_2O_3$), experimental coupler No. 3 (−0.07 nm/° C. at 5 wt. % $B_2O_3$), and experimental coupler No. 1 (−0.15 nm/° C. at 14 wt. % $B_2O_3$). FIG. 6 is a plot of the thermal spectral shift coefficients of these couplers in nm/° C. versus the $B_2O_3$ content of these couplers in wt. %. FIG. 6 provides an optimal level of boron codoping of $GeO_2$ doped silica cores to achieve temperature independence. Linear interpolation of the data as shown in FIG. 6 gives an optimal level of boron codoping of 15 wt. % $GeO_2$ doped silica cores of approximately 1.7±0.6 wt. % $B_2O_3$ (9.3 mole % $GeO_2$, 1.6 mole % $B_2O_3$, 89.1 mole % $SiO_2$) to achieve a thermal spectral shift coefficient of zero nm/° C. This optimal and sufficient $B_2O_3$ codoping concentration level is useable with a broad range of $GeO_2$ core doping levels since the thermal spectral shift coefficients of silica core waveguides doped only with germania are independent of the germania doping levels within a broad range of about 10 wt. % to 40 wt. % $GeO_2$.

Hypothetical experimental coupler No. 4 would be fabricated with the same configuration as FIG. 1 and in the same manner and set up of the comparison model except that spliced in fiber length 13 would be a 10 mm section of an experimental fiber having an optical waveguiding silica core doped with 1 wt. % to 40 wt. % of $GeO_2$, preferably 15 wt. % to 25 wt. % of $GeO_2$ and codoped with 1 wt. % to 4 wt. % $B_2O_3$, preferably 1.1 wt. % to 2.3 wt. % of $B_2O_3$. This experimental codoped fiber could be fabricated by the outside vapor deposition process using a flame hydrolysis apparatus with appropriate silica, $GeO_2$ dopant, and $B_2O_3$ codopant feedstock levels, and also by other processes, to result in such a core, which could be cladded with silica.

An additional embodiment of the invention includes the fabrication of a long period fiber gratings from an optical fiber having a silica core codoped with $B_2O_3$. Long period fiber gratings of the invention were formed using UV Excimer lasers with appropriate energies, exposure times, and grating periods.

A comparison model of a long period fiber grating was fabricated from commercially available Corning SMF- DS™, which is a dispersion shifted fiber having a dispersion shifting core profile with a peak of about 18–20 wt. % $GeO_2$. Long period gratings were written in this fiber using a laser with 550 mJ pulses at 248 nm and at an 8 Hz repetition rate for 6 minutes. Prior to writing this long period grating, the fiber was placed in a hydrogen atmosphere at 1550 psi for one week to increase the photosensitivity of the fiber. This resulted in the comparison model having a strong grating with only 9% power transmission. The thermal spectral shift of this comparison model long period fiber grating was analyzed in a similar manner as the Mach-Zehnder coupler devices. This comparison model long period fiber grating had a thermal spectral shift coefficient of 0.044 nm/° C.

Figure 7:
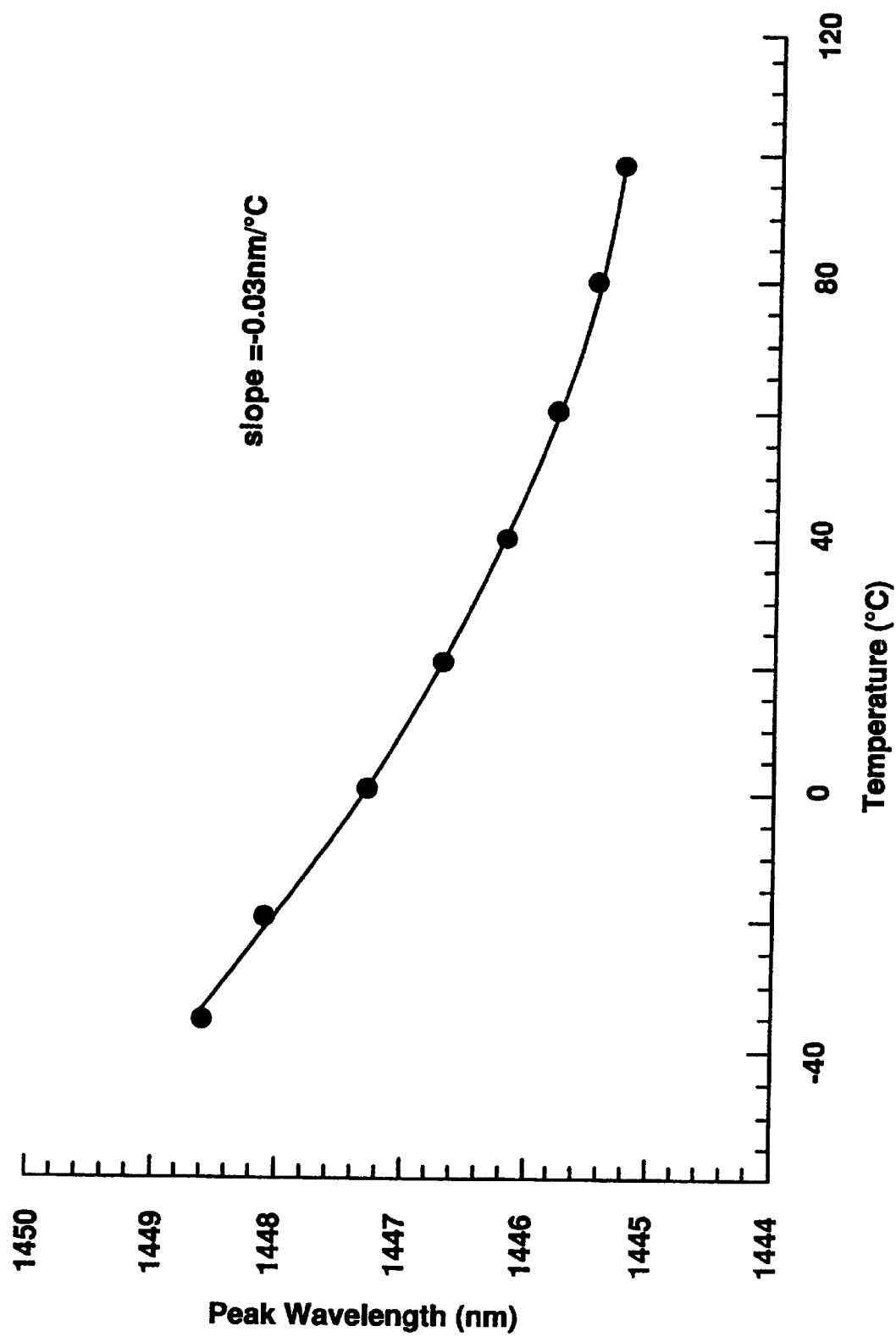
FIG. 7 is a plot of Temperature (° C.) versus Peak Wavelength (nm) for a long period fiber grating in accordance with the teachings of the present invention.

Experimental long period fiber grating No. 1 was fabricated from an experimental optical fiber having a silica core doped with 15 wt. % $GeO_2$ and codoped with 5 wt. % $B_2O_3$. This experimental codoped fiber core was cladded with a silica cladding having approximately 0.8 wt. % $B_2O_3$. Experimental long period fiber grating No. 1 was hydrogen treated then written in the same manner as the comparison model. This resulted in a weaker grating than the comparison model. Experimental long period fiber grating No. 1 had a 62% power transmission indicating that this experimental optical fiber was less photosensitive than the conventional dispersion-shifted fiber used in the comparison model. The thermal spectral shift of this long period fiber grating was analyzed in a similar manner as the Mach-Zehnder coupler devices and the long period fiber grating comparison model. The thermal spectral shift of experimental long period fiber grating No. 1 is shown in FIG. 7 which is a plot of Peak Wavelength (nm) versus Temperature (° C.). From FIG. 7 it was determined that experimental long period fiber grating No. 1 had a thermal spectral shift coefficient of –0.028 nm/° C. It is believed that experimental long period fiber grating No. 1 is more athermalized than experimental Mach-Zehnder coupler device No. 3 which used the same fiber core compositions of $Geo_2$ and $B_2O_3$ due to the presence of boron in the cladding.

Figure 8:
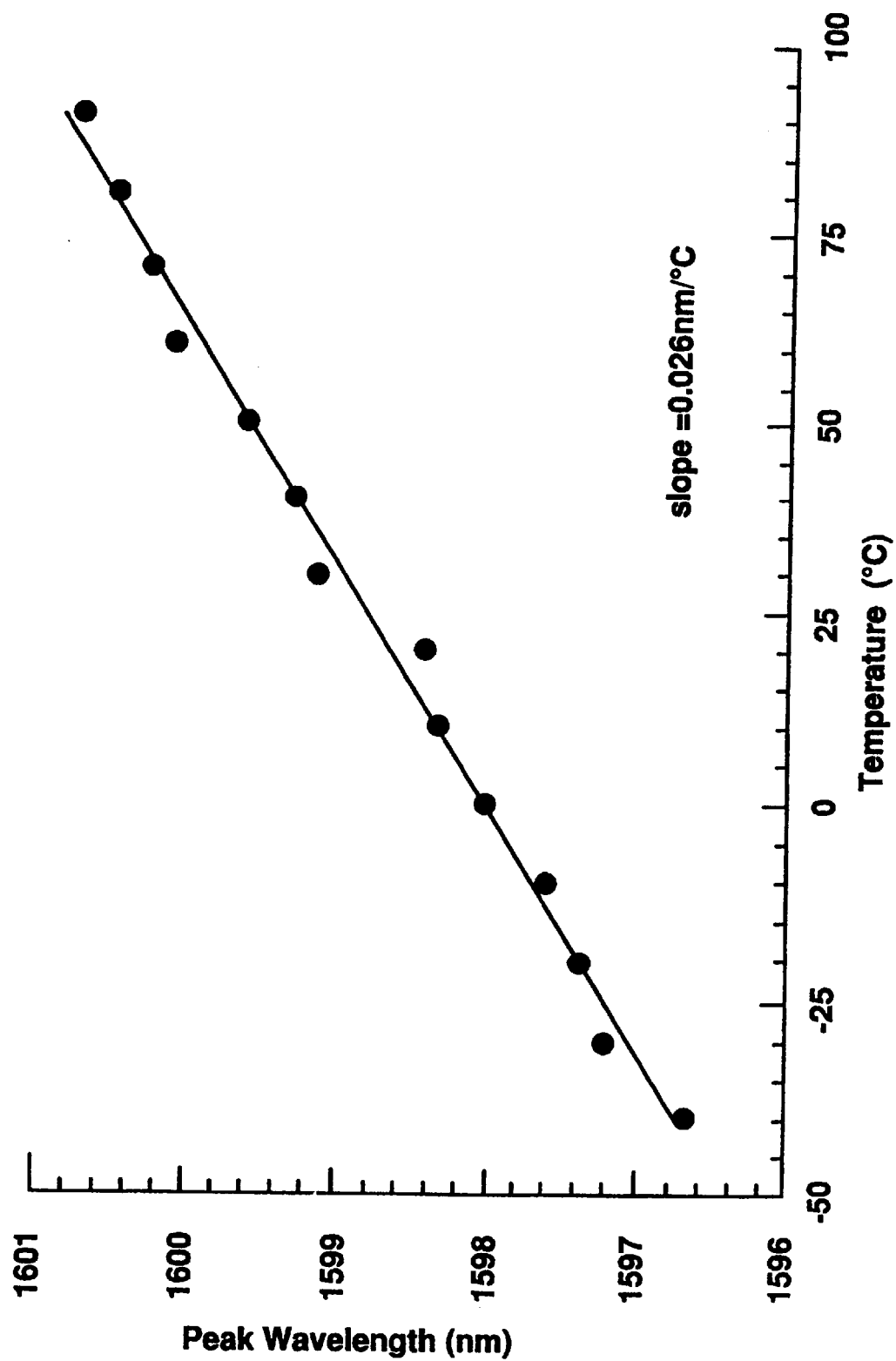
FIG. 8 is a plot of Temperature (° C.) versus Peak Wavelength (nm) for a long period fiber grating in accordance with the teachings of the present invention.

Experimental long period fiber grating No. 2 was fabricated from an experimental optical fiber having a silica core doped with 15 wt. % $GeO_2$ and codoped with 2 wt. % $B_2O_3$. This experimental codoped fiber core was cladded with a silica cladding having 1 wt. % $B_2O_3$. Experimental long period fiber grating No. 2 was hydrogen treated then written in the same manner as the comparison model. The thermal spectral shift of this long period fiber grating was analyzed in a similar manner as the Mach-Zehnder coupler devices and the long period fiber gratings. The thermal spectral shift of experimental long period fiber grating No. 2 is shown in FIG. 8 which is a plot of Peak Wavelength (nm) versus Temperature (° C.). From FIG. 8 it was determined that experimental long period grating No. 2 had a thermal spectral shift coefficient of 0.026 nm/° C.

Figure 9:
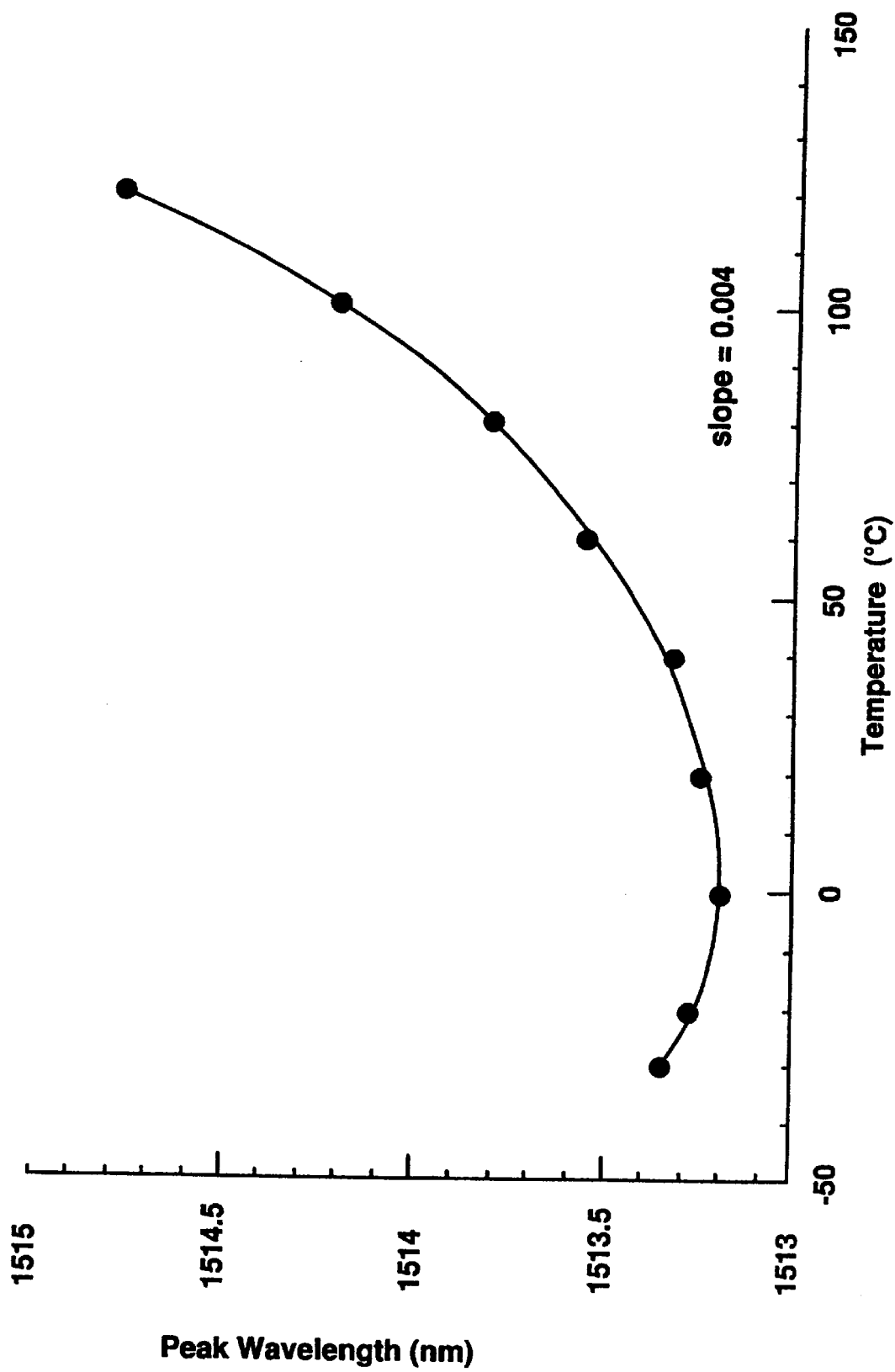
FIG. 9 is a plot of Temperature (° C.) versus Peak Wavelength (nm) for a long period fiber grating in accordance with the teachings of the present invention.

Experimental long period fiber grating No. 3 was fabricated from an experimental optical fiber having a silica core doped with 17 wt. % $GeO_2$ and codoped with 3.3 wt. % $B_2O_3$. This experimental codoped fiber core was cladded with a silica cladding having 0.9 wt. % $B_2O_3$. Experimental long period fiber grating No. 3 was hydrogen treated then written in the same manner as the comparison model. The thermal spectral shift of this long period fiber grating was analyzed in a similar manner as the Mach-Zehnder coupler devices and the long period fiber gratings. The thermal spectral shift of experimental long period fiber grating No. 3 is shown in FIG. 9 which is a plot of Peak Wavelength (nm) versus Temperature (° C.). From FIG. 9 it was determined that experimental long period grating No. 3 had a thermal spectral shift coefficient of 0.004 nm/° C.

Figure 10:
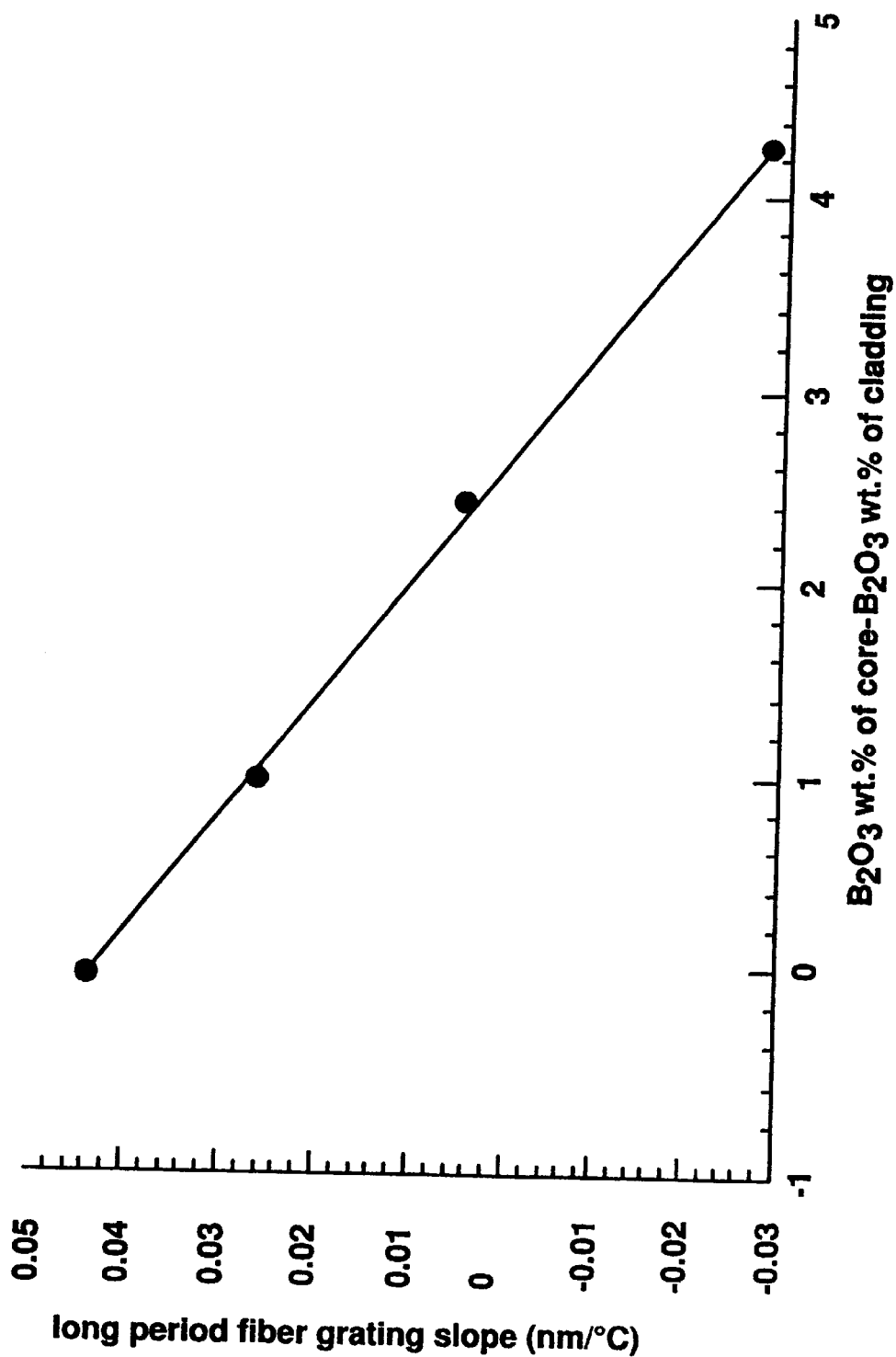
FIG. 10 is a plot of the $B_2O_3$ wt. % difference between the core and cladding of the long period fiber gratings versus the slope (nm/° C.) of the long period fiber gratings at 20° C. in accordance with the teachings of the present invention.

FIG. 10 is a plot of the thermal spectral shift coefficients of the experimental long period fiber gratings and the comparison model versus the $B_2O_3$ wt. % difference between the core and the cladding for each of these long period fiber gratings. As shown in FIG. 10, the comparison model had a thermal spectral shift coefficient of 0.044 nm/° C. and 0 $B_2O_3$ wt. % difference between its core and cladding in that it was not doped with boron. Experimental long period fiber grating No. 1 had a thermal spectral shift coefficient of –0.028 nm/° C. and a 4.2 $B_2O_3$ wt. % difference between its core of 5 wt. % $B_2O_3$ and cladding of 0.8 wt. % $B_2O_3$. Experimental long period fiber grating No. 2 had a thermal spectral shift coefficient of 0.026 nm/° C. and a 1 $B_2O_3$ wt. % difference between its core of 2 wt. % $B_2O_3$ and cladding of 1 wt. % $B_2O_3$. Experimental long period fiber grating No. 3 had a thermal spectral shift coefficient of 0.004 nm/° C. and a 2.4 $B_2O_3$ wt. % difference between its core of 3.3 wt. % $B_2O_3$ and cladding of 0.9 wt. % $B_2O_3$. As shown in FIG. 10 it is preferred to have an optical fiber with a difference in $B_2O_3$ wt. % between the core and the cladding of about 2 to 3.2 to achieve a thermal spectral shift coefficient from 0.01 to –0.01 nm/° C. An optimized athermalized long period fiber grating would have a difference of about 2.6 wt. % between the $B_2O_3$ concentrations of the core and the cladding.

Hypothetical experimental long period fiber grating No. 4 would be fabricated from an experimental optical fiber having a difference of 2.6 between the $B_2O_3$ wt. % of the core and the cladding, such as the silica core of experimental long period fiber grating No. 3 being cladded with a silica cladding having 0.7 wt. % $B_2O_3$.

An optical waveguiding silica core having about 1 wt. % to 40 wt. % of $GeO_2$, preferably 15 wt. % to 25 wt. % of $GeO_2$ and codoped with 1 wt. % to 5 wt. % of $B_2O_3$, preferably 2 wt. % to 4.5 wt. % of $B_2O_3$, and cladded with a silica cladding having from about 0 wt. % to 2 wt. % of $B_2O_3$, preferably 0.6 to 1 wt. % of $B_2O_3$ is preferred to achieve an athermalized temperature independent optical waveguide device, such as long period fiber grating. In addition, to achieve such an athermalized temperature independent optical waveguide device, particularly a long period fiber grating it is important that the difference in $B_2O_3$ concentration between the core and the cladding be in the range of about 2 to 3.2 wt. %, preferably 2.2 to 3 wt. %, as disclosed in FIG. 10.

As with the long period fiber gratings, $B_2O_3$ could be used in the silica cladding surrounding the core of an optical waveguide fiber in a Mach-Zehnder coupler device. With the optical waveguide fibers of the invention, the actual $B_2O_3$ concentration in the cladding has a relatively small effect compared to the difference of $B_2O_3$ concentration in the core and the cladding. In addition, Mach-Zehnder coupler devices could be fabricated that have more than one of the fibers doped with boron.

The experimental fibers of the invention were fabricated with a flame hydrolysis apparatus using the outside vapor deposition method to form these optical waveguide silica cores doped with $GeO_2$ and codoped with $B_2O_3$. Appropriate silica, $GeO_2$ dopant, and $B_2O_3$ codopant vaporous feedstock levels are delivered to the flame hydrolysis burner to provide for the particular dopant and codopant concentration levels. Similarly, appropriate silica and $B_2O_3$ vaporous feedstock levels are delivered to the flame hydrolysis burner to provide for the particular $B_2O_3$ concentrations in the silica cladding glass used in the long period fiber gratings.

It is believed that this inventive codoping of a $GeO_2$ doped silica core with $B_2O_3$ beneficially changes the thermal variability of the index of refraction of the waveguiding core, along with the potentially advantageous altering of the waveguide dispersion effects and stress-optic effects of the optical fiber.

The waveguide core and optical fiber composition of the invention is particularly sensitive and dependent on the $B_2O_3$ dopant concentration. In the inventive waveguide core composition, $GeO_2$ is utilized as a dopant to advantageously alter the index of refraction of the silica core in order to achieve a beneficial Λ for guiding the light and to provide photosensitivity in the long period fiber gratings. The $B_2O_3$ is utilized as a codopant to advantageously alter the thermal variability of refractive index of the silica core. A $B_2O_3$ to $GeO_2$ concentration ratio in the range of 1 wt. % $B_2O_3$:3 wt. % $GeO_2$ to 1 wt. % $B_2O_3$:10 wt. % $GeO_2$ will provide a beneficial thermal variability which inhibits and reduces thermal spectral shifts while providing an appropriate waveguide core refractive index. The preferred $B_2O_3$ to $GeO_2$ concentration ratio is in the range of 1 wt. % $B_2O_3$:4 wt. % $GeO_2$ to 1 wt. % $B_2O_3$:6 wt. % $GeO_2$. The most preferred $B_2O_3$ to $GeO_2$ concentration ratio of the invention is 1 wt. % $B_2O_3$:5 wt. % $GeO_2$.

In view of obtaining an advantageous core to cladding $B_2O_3$ concentration difference, the preferred core composition is from 1–40 wt. % $GeO_2$ and 0.5–15 wt. % $B_2O_3$. The more preferred core composition is from 4–25 wt. % $GeO_2$ and 0.75–7 wt. % $B_2O_3$. The most preferred core composition is from 6–20 wt. % $GeO_2$ and 1–3 wt. % $B_2O_3$.

Also in view that in the invention $GeO_2$ is used as an index raising altering dopant to guide light waves and that $B_2O_3$ is used as a negative thermal spectral shift dopant to neutralize the positive thermal spectral shift of the index raising dopant and silica composition, the preferred molar ratio is 1 mole of $B_2O_3$ to 2–4 total moles of index raising dopants which includes dopants such as germanium and phosphorous. The most preferred molar ratio of negative thermal spectral shift dopants to the total moles of index raising dopants is 1 mole of $B_2O_3$ to 3 total moles of index raising dopants to achieve an athermalized optical waveguide.

It will be apparent to those skilled in the art that various modifications and variations can be made in the composition and method of the present invention without departing from the spirit or scope of the invention. Thus, it is intended that the present invention cover the modifications and variations of the invention provided they come within the scope of the appended claims and their equivalents.

We claim:

1. An optical waveguide device comprised of an optical fiber which includes waveguiding silica core doped with an index raising dopant, wherein said waveguiding core is codoped with a sufficient amount of $B_2O_3$ to inhibit thermal spectral shifts in the device caused by a change in the temperature of said device, such that the average thermal slope $\Delta\lambda(nm)/\Delta T(° C.)$ is less than 0.04.

2. An optical waveguide device as claimed in claim 1 wherein said index raising dopant is $GeO_2$.

3. An optical waveguide device comprising an optical waveguiding silica core doped with an index raising dopent, wherein said waveguiding core is codoped with a sufficient amount of $B_2O_3$ to inhibit thermal spectral shifts in the device caused by a change in the temperature of said device such that the average thermal slope $\Delta\lambda(nm)/\Delta T(° C.)$ is less than 0.04, and wherein said waveguide device comprises a transmitting filter.

4. An optical waveguide device comprising an optical waveguiding silica core doped with an index raising dopent, wherein said waveguiding core is codoped with a sufficient amount of $B_2O_3$ to inhibit thermal spectral shifts in the device caused by a change in the temperature of said device such that the average thermal slope $\Delta\lambda(nm)/\Delta T(° C.)$ is less than 0.04, wherein a mode guided by said waveguiding core is coupled to a second waveguiding core.

5. An optical waveguide device as claimed in claim 4 wherein said device is comprised of a Mach-Zehnder interferometer.

6. An optical waveguide device comprising an optical waveguiding silica core doped with an index raising dopant, wherein said waveguiding core is codoped with a sufficient amount of $B_2O_3$ to inhibit thermal spectral shifts in the device caused by a change in the temperature of said device, and a cladding, wherein a mode propagating in said core is coupled to a mode in said cladding.

7. An optical waveguide device as claimed in claim 6 wherein said device is comprised of a long period fiber grating.

8. An athermalized optical waveguide device comprising an optical waveguiding silica core doped with an index raising dopent, wherein said waveguiding core is codoped with a sufficient amount of $B_2O_3$ to inhibit thermal spectral shifts in the device caused by a change in the temperature of said device such that the average thermal slope $\Delta\lambda(nm)/\Delta T(° C.)$ is less than 0.04, wherein said index raising dopant comprises $GeO_2$, wherein said silica core has a $B_2O_3$:$GeO_2$ ratio ranging from 1 wt. % $B_2O_3$:3 wt. % $GeO_2$ to 1 wt. % $B_2O_3$:10 wt. % $GeO_2$.

9. An optical waveguide device comprising an optical waveguiding silica core doped with an index raising dopant comprising $GeO_2$, wherein said waveguiding core is codoped with a sufficient amount of $B_2O_3$ to inhibit thermal spectral shifts in the device caused by a change in the temperature of said device such that the average thermal slope $\Delta\lambda(nm)/\Delta T(° C.)$ is less than 0.04, and wherein said silica core has a $B_2O_3$:$GeO_2$ ratio ranging from 1 wt. % $B_2O_3$:4 wt. % $GeO_2$ to 1 wt. % $B_2O_3$:6 wt. % $GeO_2$.

10. An optical waveguide device comprising an optical waveguiding silica core doped with an index raising dopant, wherein said waveguiding core is codoped with a sufficient amount of $B_2O_3$ to inhibit thermal spectral shifts in the device caused by a change in the temperature of said device, wherein said index raising dopant is $GeO_2$, and wherein said silica core has a $B_2O_3$:$GeO_2$ ratio of 1 wt. % $B_2O_3$:5 wt. % $GeO_2$.

11. An athermalized optical waveguide fiber compromised of a silica glass with:

(i) a dopant content compromised of $B_2O_3$ in an amount sufficient to inhibit thermal spectral shifts in the device caused by change in the temperatures of said device such that the average thermal slope $\Delta\lambda(nm)/\Delta T(° C.)$ is less than 0.04; and (ii) a plurality of index raising dopant molecules.

12. A waveguide as claimed in claim 11 wherein said dopant content has a $B_2O_3$:index raising dopant molar ratio ranging from 1 mole $B_2O_3$:2 moles of index raising dopant molecules to 1 mole $B_2O_3$:7 moles of index raising dopant molecules.

13. An athermalized optical waveguide comprising a silica glass with a dopant content comprised of $B_2O_3$ and a plurality of index raising dopant molecules, wherein said dopant content has a $B_2O_3$:index raising dopant molar ratio ranging from 1 mole $B_2O_3$:3 moles of index raising dopant molecules to 1 mole $B_2O_3$:4 moles of index raising dopant molecules.

14. An athermalized an optical waveguide device compromised of fiber which includes:
a silica glass core with a dopant content consisting essentially of $GeO_2$ and $B_2O_3$ in an amount sufficient to inhibit thermal spectral shifts in the device caused by change in the temperatures of said device such that the average thermal slope $\Delta\lambda(nm)/\Delta T(°C.)$ is less than 0.04.

15. An optical waveguide as claimed in claim 14 wherein said dopant content has a $B_2O_3:GeO_2$ ratio ranging from 1 wt. % $B_2O_3$:3 wt. % to $GeO_2$ to 1 wt. % $B_2O_3$:10 wt. % $GeO_2$.

16. An optical waveguide as claimed in claim 14 wherein said dopant content consists essentially of 10 wt. % to 30 wt. % $GeO_2$ and 1 wt. % to 5 wt. % $B_2O_3$.

17. An optical waveguide as claimed in claim 14 wherein said dopant content has a $B_2O_3:GeO_2$ molar ratio ranging from 1 mole $B_2O_3$:1.5 moles $GeO_2$ to 1 mole $B_2O_3$:8 moles $GeO_2$.

18. A method of athermalized an optical waveguide compromising an optical fiber to inhibit thermal spectral shifts, said method comprising:
(a) forming a silica waveguide fiber core;
(b) doping said silica waveguide fiber core with $GeO_2$; and
(c) codoping said silica waveguide fiber core with $B_2O_3$ in an amount sufficient to inhibit thermal spectral shifts in the device caused by change in the temperatures of said device such that the average thermal slope $\Delta\lambda(nm)/\Delta T(°C.)$ is less than 0.04.

19. The method of athermalizing an optical waveguide device as claimed in claim 18 wherein the step of codoping the silica waveguide core with $B_2O_3$ comprises the step of codoping said silica waveguide core with a sufficient amount of $B_2O_3$ wherein said waveguide device exhibits a thermal spectral shift of less than 0.04 nm/°C. at 1550 nm.

20. The method of athermalizing an optical waveguide device as claimed in claim 18, wherein said method further comprises the steps of:
codoping said $GeO_2$ doped silica waveguide core with a sufficient amount of $B_2O_3$ to neutralize said $GeO_2$ doped silica waveguide core's thermal sensitivity.

21. The method of athermalizing an optical waveguide device as claimed in claim 18 wherein said method further comprises the step of cladding said codoped waveguide core with a $B_2O_3$ doped silica.

22. A method of athermalizing an optical waveguide device to inhibit thermal spectral shifts, said method comprising:
(a) forming a silica waveguide core;
(b) doping said silica waveguide core with $GeO_2$1, and
(c) codoping said silica waveguide core with $B_2O_3$ in an amount sufficient to inhibit thermal spectral shifts in the device caused by change in the temperatures of said device such that the average thermal slope $\Delta\lambda(nm)/\Delta T(°C.)$ is less than 0.04, and
(d) forming a Mach-Zender interferometer with sadi codoped silica waveguide core.

23. A method of athermalizing an optical waveguide device to inhibit thermal spectral shifts, said method comprising:
(a) forming a silica waveguide core;
(b) doping said silica waveguide core with $GeO_2$1;
(c) codoping said silica waveguide core with $B_2O_3$ in an amount sufficient to inhibit thermal spectral shifts in the device caused by change in the temperatures of said device such that the average thermal slope $\Delta\lambda(nm)/\Delta T(°C.)$ is less than 0.04;
(d) cladding said codoped waveguide core to form an optical waveguide; and
(e) writing a log period grating in said formed optical waveguide.

24. A method of reducing the temperature dependence of an optical waveguide device comprising an optical fiber, said method comprising:
(a) forming a waveguide core;
(b) doping the waveguide core with an index raising dopant having a positive thermal spectral shift slope;
(c) codoping said waveguide core with a second dopant having a negative thermal spectral shift slope such that the average thermal slope $\Delta\lambda(nm)/\Delta T(°C.)$ is less than 0.04;
(d) cladding said waveguide core; and
(e) fabricating an optical waveguide fiber device from said cladded codoped waveguide core.

25. The method of claim 24, wherein said step of codoping further comprises the step of neutralizing the positive thermal spectral shift slope of the waveguide device with the second dopant.

26. The method of claim 24, wherein said step of codoping said waveguide core with a second dopant comprises the step of codoping said waveguide core with an index depressing dopant.

27. The method of claim 24, wherein said step of codoping said waveguide core with a second dopant comprises the step of codoping said waveguide core with boron.

28. The method of claim 24, wherein said step of cladding said waveguide core comprises the step of cladding the waveguide core with a glass doped with said second dopant.

29. A method of reducing the temperature dependence of an optical waveguide device, said method comprising:
(a) forming a waveguide core;
(b) doping the waveguide core with an index raising dopant having a positive thermal spectral shift slope;
(c) codoping said waveguide core with a second dopant having a negative thermal spectral shift slope;
(d) cladding said waveguide core; and
(e) fabricating an optical waveguide device from said cladded codoped waveguide core, wherein said step of codoping said waveguide core with a second dopant comprises the step of codoping with an amount of said second dopant so that the molar ratio of said second dopant to said index raising dopant is in the range of 1 mole of said second dopant to 2–4 moles of said index raising dopant.

30. A method of making an optical device which includes a fiber reduced temperature dependence, said method comprising:
(a) doping a fiber waveguide with an index altering dopant which allows light to be guided; and
(b) doping the fiber waveguide with a temperature dependence liberating dopant which reduces the temperature dependence of the fiber waveguide such that the average thermal slope $\Delta\lambda(nm)/\Delta T(°C.)$ is less than 0.04.

* * * * *